United States Patent [19]

Lee et al.

[11] 4,046,834

[45] Sept. 6, 1977

[54] TREATMENT OF VULCANIZED RUBBER

[75] Inventors: Timothy Charles Philip Lee; William Millns, both of Shrewsbury, England

[73] Assignee: Gould Inc., Rolling Meadows, Ill.

[21] Appl. No.: 431,623

[22] Filed: Jan. 8, 1974

[51] Int. Cl.$^2$ .............................................. C68L 7/00
[52] U.S. Cl. ...................................... 260/752; 260/3; 260/23.7 M
[58] Field of Search ............... 260/752, 23.7 M, 86.1, 260/3, 2.3, 712, 714

[56] References Cited

U.S. PATENT DOCUMENTS

| 1,432,895 | 9/1922 | Playson | 260/714 |
|---|---|---|---|
| 1,653,472 | 12/1925 | Scherbaum | 241/5 |
| 1,680,862 | 8/1928 | Cude | 260/711 |
| 1,680,915 | 8/1928 | Rose | 260/711 |
| 1,708,123 | 4/1929 | Day | 241/5 |
| 1,932,661 | 10/1933 | Halstead | 260/752 |
| 2,052,607 | 9/1936 | Cowdery | 260/752 |
| 2,096,336 | 10/1937 | Pickett | 260/729 |
| 2,128,127 | 8/1938 | Epstein | 260/752 |
| 2,423,033 | 6/1947 | le Beau | 260/2.3 |
| 2,853,742 | 9/1958 | Dasher | 260/2.3 |
| 2,903,439 | 9/1959 | Wolf | 260/23.7 M |
| 3,329,349 | 7/1967 | Pasteka | 241/34 |
| 3,383,340 | 5/1968 | MacCallum | 260/3 |
| 3,460,769 | 8/1969 | Merges | 241/17 |
| 3,462,086 | 8/1962 | Bertrand | 241/5 |
| 3,790,511 | 2/1974 | Horie | 260/729 |

FOREIGN PATENT DOCUMENTS 156,150 3/1922 United Kingdom ................ 260/714

OTHER PUBLICATIONS

Skeist, "Handbook of Adhesives", 1962, p. 272.

*Primary Examiner*—Melvyn I. Marquis
*Assistant Examiner*—William Parker
*Attorney, Agent, or Firm*—Edward E. Sachs

[57] ABSTRACT

The invention provides finely divided vulcanized rubber having a particle size of generally less than 20 microns for re-use in the rubber industry. Vulcanizates produced from compositions containing the finely divided vulcanized rubber, either as the sole rubber component or in admixture with unvulcanized rubber, have properties significantly better than those of vulcanizates of similar compositions containing conventional reclaimed rubbers. Vulcanized rubber is converted into the finely divided rubber by the steps of (1) contacting vulcanized rubber with a fatty acid, (2) contacting the product of step (1) with a solid alkali and (3) forming a dispersion of the product of step (2) with a liquid which dissolves the alkali but does not affect the rubber. Alternatively, the finely divided vulcanized rubber results from the steps of (1) contacting the vulcanized rubber with a liquid effective to swell the rubber and thereby weaken it e.g. tetrahydrofuran, (2) comminuting the weakened material and (3) removing the liquid from the comminuted material.

15 Claims, No Drawings

TREATMENT OF VULCANIZED RUBBER

This invention relates to rubbers.

The re-use of vulcanised rubber in a finely-divided form is well-known in the rubber industry. Such material is usually prepared by grinding on a two-roll mill and normally has a particle size such that it will pass through a "40's mesh" screen (i.e. 388 microns in diameter). It is also well-known that when this crumb is added to a rubber compound, the tensile strength and other important properties of the vulcanisate deteriorate by a substantial amount.

We have now found that vulcanised natural or synthetic rubber can be finely-divided such that the particle size is generally less than 20 microns, and that this micronised crumb can be added to a rubber compound or composition and the whole vulcanised to give a product whose physical properties are only slightly worse than those given by vulcanisates of that compound.

According to the present invention therefore, finely divided vulcanised rubber has a particle size of generally less than 20 microns and the properties of its compounds are significantly better than those of conventional reclaimed rubbers. Preferably at least 90% of the vulcanised rubber particles have a size of less than 20 mircrons.

The invention includes a rubber composition containing the finely divided rubber particles as the sole rubber component and having properties significantly better than those of similar compositions containing conventional reclaimed rubbers. This rubber composition may be vulcanised to form a vulcanisate having a tensile strength of above $9MN/m^2$ and preferably having a tear strength above 55 N/Std.

The invention also includes a rubber composition comprising in admixture the finely divided vulcanised rubber and unvulcanised rubber. Depending on the amount of unvulcanised rubber in the mixture, this rubber composition may be vulcanised to form vulcanisates containing from 10 to 70% by weight of the finely divided vulcanised rubber and with tensile strengths ranging from 23 to 15 $MN/m^2$. The term "$MN/m^2$" means meganewton per square meter. 1 $MN/m^2$ corresponds to 145 psi. British Standard 903 Part A3 clarifies the meaning of the term "N/Std.". One "Std." equal two millimeters. Accordingly, it follows that one Newton per Std. equals 2.855 pounds per inch.

It will be appreciated that the rubber compositions may contain, in addition to the rubber components, conventional auxiliary substances such as accelerators, cross-linking agents, fillers, antioxidants and softeners.

One method of manufacture of the micronised crumb of the invention comprises the following steps:-
1. addition of fatty acid to the vulcanised rubber e.g. oleic acid, stearic acid, tall oil fatty acids or rosin acids,
2. mixing a solid alkali with the product of step (1), and
3. forming a dispersion of the product of step (2) with a liquid which dissolves the alkali but does not affect the rubber e.g., water, methyl alcohol or ethylene glycol.

In the first step, the vulcanised rubber may be comminuted or shredded and the resultant coarse crumbs allowed to absorb up to 15% by weight (e.g. 3% by weight) of a fatty acid such as oleic acid. The plasticised vulcanisate may then be sheeted out on a two-rolled mill using a tight nip.

In the second step of the process, the solid alkali may be dusted on to the sheet. The solid alkali may be an alkali metal hydroxide such as sodium hydroxide or potassium hydroxide, although weaker alkalis or bases, such as sodium carbonate, or mixtures of alkalis or bases, such as sodium hydroxide/sodium tetraborate, may also be used. The amount of alkali used may be 2 to 25 parts by weight per 100 parts by weight of rubber e.g. 10 parts by weight of alkali.

The mechanical treatment of the rubber may be continued during or after the addition of the alkali e.g. by extruding the rubber mixture, and the temperature of the rubber mixture at this stage may be higher than in the first step, but it should preferably be kept as low as possible. The comminuting of the rubber with solid alkali may be continued until the rubber mixture is friable, at which time it is also hydrophilic.

The rubber dispersion of the third step may be obtained by mixing the friable rubber mixture obtained in the second step with water and further comminuting the rubber particles in the resulting mixture by any method effective to produce rubber particles of the required size. A suitable method of comminution is for example to pass the aqueous mixture between two discs, one of which may be fixed and the other rotating at constant speed or both of which are rotating either in opposite directions or in the same direction at different speeds. In this way, the rubber particles in an aqueous mixture may be mechanically broken down and stabilised as an aqueous dispersion of the rubber obtained.

This aqueous dispersion of the rubber may issue as a stable creamy paste. To obtain dry powder from this, the paste, possibly after dilution with water, may be coagulated with acid e.g. hydrochloric acid, or other electrolyte e.g. sodium chloride, or any coagulating technique. It may then be fed into a centrifugal dryer, where the liquid is removed. The product may then be washed with water until the effluent from the dryer is neutral to universal indicator paper. Alternatively it is possible to produce the powder merely by separation of the liquid in a centrifugal dryer followed by washing with water until the effluent is neutral. The product is in the form of a fine powder which is preferably dried at a temperature sufficiently low to avoid damaging the structure of the rubber.

It would appear that the mechanical working helps to disperse the fatty acid more uniformly throughout the whole mass. The alkali then reacts with the acid, dispersed within the thin layers, thus resulting in finer particles. It also facilitates the formation of a suspension on the addition of water if suitable mechanical action is applied.

Another method of manufacture of the micronised crumb of the invention comprises the following steps:-
1. swelling of the vulcanised rubber in a liquid to weaken the rubber,
2. comminution of the weakened material (to give a fine crumb), and
3. removal of the liquid from the communited material.

In the first step the vulcanised rubber, either in the form of thin sheets, shreds or crumb may be allowed to imbibe as much liquid as it will take up. Such liquids may be polar liquids such as tetrahydrofuran, methylethyl ketone, ethyl acetate or chloroform.

The swollen rubber of low strength is then preferably introduced into a machine suitable for comminuting it to the desired fineness. Such a machine may be a two-roll mill or a disc mill or other machine. In the disc mill for instance, the swollen rubber containing the water-miscible liquid is passed between two discs, one of which may be fixed and the other rotating at constant speed or both of which are rotating in opposite directions or in the same direction at different speeds. Both the swelling and the subsequent comminution steps are preferably carried out at ambient temperature, but higher temperatures may be used provided that they are insufficient to damage the rubber structure.

The swelling liquid may be removed from the rubber either by flashing off or by addition of a non-swelling liquid which is miscible with it but not miscible with the rubber: the latter causes separation of the rubber from the swelling liquid. A preferred example of the latter method is that when the swelling liquid is tetrahydrofuran and the non-swelling liquid is water: the two liquids form a homogenous phase which has no affinity for the rubber and hence the latter is precipitated as a fine-particle material. In general, in selecting the non-swelling liquid to be used in conjunction with the swelling liquid, the following conditions should be fulfilled for ease of the recovery of the liquids and the rubber:- a. the non-swelling liquid should be of a higher boiling-point than the liquid used to swell the rubber,
b. the swelling liquid and the non-swelling liquid must be readily miscible with one another.

The rubber may be readily separated from the liquid/liquid mixture by any suitable technique which does not alter its structure, e.g. residual liquid may be removed from the rubber by flashing it off and then drying the rubber to remove the non-solvent, leaving the product in the form of a fine powder.

It is a preferred feature of the methods of the invention that the temperature should be kept as low as possible at all times, since at temperatures above 100° C the molecules of natural rubber are known to rupture, giving an inferior material with lower molecular weight. In the case of synthetic rubbers the reactions are more complicated; in some cases material of low molecular weight is formed and in others additional cross-linking occurs after the initial rupture and a material of much higher molecular weight is produced. In either case the product is inferior to the original material.

Reclaimed rubber or "reclaim" is sometimes used to replace some of the virgin rubber in a compound: this is produced as a result of the effect of high temperature (in excess of 150° C) on vulcanised rubber, and gives properties which are markedly inferior to the original vulcanisates (see Examples I and IV below). Commercial reclaims, further, are usually produced in bulk form and cannot readily be obtained as a powder: with the present tendency to use powdered rubbers and powdered ingredients for automatic weighing and processing, this is a further disadvantage of this latter form of recycled rubber. The finely-divided, vulcanized, recycled rubber of this invention is, advantageously, obtained in powder form.

EXAMPLE I 300 g. of a commerical whole tyre crumb (40 mesh size) are milled for ten minutes on a two roll mill (22 × 44 cm.) at a setting of 0.12 mm., with 9 g. of oleic acid. At this stage 30 g. of powdered solid sodium hydroxide are added evenly to the rubber mix and milling continued for a further ten minutes. The temperature of the mill is 60° C.

The product in the form of a dry friable sheet, is removed from the mill and placed in the hopper of a commercial 7.5 cm. disc mill. Onto the product is poured sufficient water to wet it (500 ml.). The mill is started with a gap setting on the grinding stones (46 grit carborundum) of 0.5mm. and a running speed of 4000 rpm. The product issuing from the mill is a stable creamy paste. This is fed directly into a commerical centrifugal dryer where it is retained in a polyester fabric (750 denier) bag. The water is removed centrifugally and the product wash by continuous addition of water to the spin dryer. The washing is continued until the wash water is neutral to universal indicator paper. The product, in the form of a fine powder, is dried under vacuum (10 mm mercury) at 80° C.

EXAMPLE II

Example I was repeated except that the product from the disc mill is diluted with water and neutralised by the addition of dilute (2 N) hydrochloric acid. The vulcanisates obtained have similar properties to those prepared by Example I.

For comparison of the fine powder prepared as in Example I with a conventional reclaimed rubber, 100 parts by weight of each of these two materials were compounded with 2 parts of zinc oxide, 1 part of stearic acid, 1 part of Flectol H, 0.27 parts of cyclohexylbenzthiazylsulphenamide, 0.24 parts of diphenylguanidine and 0.53 parts of sulphur. Slabs 150 × 150 × 2 mm were press-moulded to optimum cure at 150° C. On testing by standard methods the following results were obtained: -

Table I

| | Whole Tyre Reclaim | Micronised Crumb |
|---|---|---|
| Tensile Strength ($MN/m^2$) | 7.4 | 10.4 |
| Elongation at Break (%) | 360 | 300 |
| Modulus 100% ($MN/m^2$) | 1.6 | 2.4 |
| Modulus 300% ($MN/m^2$) | 5.7 | 10.5 |
| Hardness (IRHD) | 55 | 67 |
| Tear Strength (Crescent) (N/Std) | 51 | 58 |
| Taber Abrasion loss (g/1000 cycles) | 0.8 | 0.46 |

It will be seen that there is a good improvement in the tensile strength of the compound made from the micronised product. Improvement is also seen in the taber abrasion and tear strength.

For a further comparison of the fine powder with 40's mesh type crumb and conventional reclaimed rubber, 82 parts by weight of each of the three materials were compounded with 100 parts of styrene butadiene rubber (Grade 1500), 3 parts of zinc oxide, 3 parts of stearic acid, 1 part of Flectol H, 43 parts of HAF black, 10 parts of Dutrex R softener, 0.9 parts of cyclohexylbenzthiazylsulphenamide, 0.8 parts of diphenylguanidine and 1.75 parts of sulphur. Slabs 150 × 150 × 2 mm. were press-moulded at a temperature of 150° C. for 15 minutes. A similar slab of the base compound (i.e. without any form of recycled rubber) was also prepared. On testing by standard methods the following results were obtained:-

Table II

| Type of additive | 1. Nil | 2. 40's mesh crumb | 3. Whole tyre reclaim | 4. Micronised crumb |
|---|---|---|---|---|
| Tensile strength (MN/m$^2$) | 23.7 | 15.5 | 15.9 | 18.7 |
| Elongation at break (%) | 580 | 400 | 520 | 490 |
| Modulus 100% extension | 1.5 | 1.7 | 1.6 | 1.6 |
| Modulus 300% extension | 8.9 | 9.7 | 7.2 | 8.6 |
| Hardness (IRHD) | 63 | 63 | 62 | 61 |
| Taber abrasion loss (g/1000 cycles) | 0.1345 | 0.2202 | 0.2459 | 0.1454 |

The rubber in column 1 above contained no recycled rubber. The rubbers in columns 2 to 4, all contained recycled rubber, that of column 4 being made in accordance with the invention. It will be seen that the tensile strength of rubber 4, although lower than that of rubber 1, is superior to that of rubbers 2 and 3. Rubber 4 also has satisfactory abrasion resistance.

EXAMPLE III 300 g. of a commercial whole tyre crumb (40 mesh size) is milled for five minutes on a two-roll mill (22 × 44 cm.) at a setting of 0.12 mm. The temperature of the mill is 75° C. The product from the mill is placed in a five liter beaker and swollen using one liter of tetrahydrofuran. The swollen mass is placed in the hopper of a 7.5 cm. commercial disc mill. The mill is started with the grinding stones (46 grit carborundum) set at 0.05 mm and at a speed of 4000 rpm. The product issuing from the machine is collected and the excess tetrahydrofuran removed by evaporation at atmospheric pressure or under vacuum (10 mm of mercury) at 90° C. The product is in the form of small lumps, which break down to fine particles if dispersed in raw rubber.

EXAMPLE IV 300 g. of a commerical whole tyre crumb (40 mesh size) is milled for five minutes on a two roll mill (22 × 44 cm.) at a setting of 0.12 mm. The temperature of the mill is 60° C. The product from the mill is placed in a five liter beaker and swollen using one liter of tetrahydrofuran. The swollen crumb is placed in the hopper of a commercial 7.5 cm disc mill. The mill is started with the grinding stones (46 grit carborundum) set at 0.05 mm and at a speed of 4000 rpm. The product from the disc mill is placed in a five liter beaker and one liter of water added with stirring. The fine powdered product separates out and is filtered using standard laboratory glassware. The powdered product is dried under vacuum (10 mm.Hg.) at 60° C.

EXAMPLE V

Example IV was repeated except that methyl ethyl ketone is used in place of tetrahydrofuran. The properties of the vulcanisates obtained were similar to those obtained in Example IV.

For comparison of the fine powder prepared as in Example IV with a conventional reclaimed rubber, 100 parts by weight of each of these two materials were compounded with 2 parts of zinc oxide, 1 part of stearic acid, 1 part of Flectol H, 0.27 parts of cyclohexylbenzthiazylsulphenamide, 0.24 parts of diphenylguanidine and 0.53 parts of sulphur slabs 150 × 150 × 2 mm were press-moulded to optimum cure at 150° C. On testing by standard methods the following results were obtained:-

Table III

| | Whole Tyre Reclaim | Micronised Crumb |
|---|---|---|
| Tensile strength (MN/m$^2$) | 7.4 | 13.2 |
| Elongation at break (%) | 360 | 300 |
| Modulus 100% (MN/m$^2$) | 1.6 | 2.3 |
| Modulus 300% (MN/m$^2$) | 5.7 | 12.4 |
| Hardness (IRHD) | 55 | 64 |
| Tear strength (Crescent) (N/Std) | 51 | 85 |
| Taber abrasion loss (g/1000 cycles) | 0.8 | 0.45 |

It will be seen that there is a good improvement in the tensile strength of the compound made from the micronised product. Improvement is also seen in the taber abrasion and tear strength.

For a further comparison of the fine powder prepared as in Example IV with 40's mesh tyre crumb and conventional reclaimed rubber 82 parts by weight of each of the three materials were compounded with 100 parts of styrene butadiene rubber (Grade 1500), 3 parts of zinc oxide, 3 parts of stearic acid, 1part of Flectol H, 43 parts of HAF black, 10 parts of Dutrex R softener, 0.9 parts of cyclohexylbenzthiazylsulphenamide, 0.8 parts of diphenylguanidine and 1.75 parts of sulphur. Slabs 150 × 150 × 2 mm were press-moulded at a temperature of 150° C for 15 minutes. A similar slab of the base compound (i.e., without any form of recycled rubber) was also prepared. On testing by standard methods the following results were obtained:-

Table IV

| Type of additive | 1. Nil | 2. 40's mesh crumb | 3. Whole tyre reclaim | 4. Micronised crumb |
|---|---|---|---|---|
| Tensile strength (MN/m$^2$) | 23.7 | 15.5 | 15.9 | 21.4 |
| Elongation at break (%) | 580 | 400 | 520 | 540 |
| Modulus, 100% elongation (MN/m$^2$) | 1.5 | 1.7 | 1.6 | 1.6 |
| Modulus, 300% elongation (MN/m$^2$) | 8.9 | 9.7 | 7.2 | 8.8 |

Table IV-continued

| Type of additive | 1. Nil | 2. 40's mesh crumb | 3. Whole tyre reclaim | 4. Micronised crumb |
| --- | --- | --- | --- | --- |
| Hardness (IRHD) | 63 | 63 | 62 | 64 |
| Taber abrasion loss (g/1000 cycles) | 0.1345 | 0.2202 | 0.2459 | 0.2011 |

The rubber in column 1 above contained no recycled rubber. The rubbers in columns 2 to 4 all contained recycled rubber, that of column 4 being made in accordance with the invention. It will be seen that the tensile strength and abrasion resistance of rubber 4 are superior to those for rubbers 2 and 3.

We claim:

1. A finely-divided, vulcanized, recycled rubber comprised predominently of particles having a particle size less than 20 microns, said particles being further characterized by the property of separating out from an admixture with water.

2. A finely-divided, vulcanized, recycled rubber as claimed in claim 1 wherein at least 90% of said particles have a particle size less than 20 microns.

3. A cured rubber composition, said rubber composition, before curing, comprising a finely-divided, vulcanized, recycled rubber as claimed in claim 1 and an unvulcanized, non-recycled rubber.

4. A finely-divided, vulcanized, recycled rubber comprised predominently of particles having a particle size less than 20 microns, said finely-divided rubber being further characterized by yielding a vulcanizate having a tensile strength of above 9 MN/m² and a tear strength above 55 N/Std. when a rubber composition containing said particles as the sole rubber component is vulcanized.

5. A finely-divided, vulcanized, recycled rubber as claimed in claim 4 wherein at least 90% of said particles have a particle size less than 20 microns.

6. A cured rubber composition, said rubber composition, before curing, comprising a finely-divided, vulcanized, recycled rubber as claimed in claim 4 and an unvulcanized, non-recycled rubber.

7. A finely-divided, vulcanized, recycled rubber comprised predominently of particles having a particle size less than 20 microns, said finely-divided rubber being further characterized by yielding a vulcanizate having a tensile strength of above 9 MN/m² and a tear strength above 55 N/Std. when a rubber composition containing said particles as the sole rubber component is vulcanized by compounding 100 parts by weight of said particles with 2 parts of zinc oxide, 1 part of stearic acid, 1 part of polymerized 1,2-dihydro 2,2,4-trimethylquinoline, 0.27 parts of cyclohexyl-benzthiazyl-sulphenanide, 0.24 parts of diphenylguanidine and 0.53 parts of sulfur, and press molded to optimum cure at 150° C.

8. A finely-divided, vulcanized, recycled rubber as claimed in claim 7 wherein at least 90% of said particles have a particle size less than 20 microns.

9. A cured rubber composition, said rubber composition, before curing, comprising a finely-divided, vulcanized, recycled rubber as claimed in claim 7 and an unvulcanized, non-recycled rubber.

10. The finely-divided rubber of claim 2 wherein said rubber, before recycling, comprises whole tyre crumb.

11. The finely-divided rubber of claim 5 wherein said rubber, before recycling, comprises whole tyre crumb.

12. The finely-divided rubber of claim 8 wherein said rubber, before recycling, comprises whole tyre crumb.

13. A cured rubber composition, said rubber composition, before curing, comprising a finely-divided, vulcanized, recycled rubber as claimed in claim 2 and an unvulcanized, nonrecycled rubber.

14. A finely-divided, recycled rubber as claimed in claim 8, said recycled rubber particles being further characterized by the property of separating out from admixtures with water.

15. A cured rubber composition, said rubber composition, before curing, comprising a finely-divided, vulcanized, recycled rubber as claimed in claim 14 and an unvulcanized, nonrecycled rubber.

* * * * *